Patented July 26, 1938

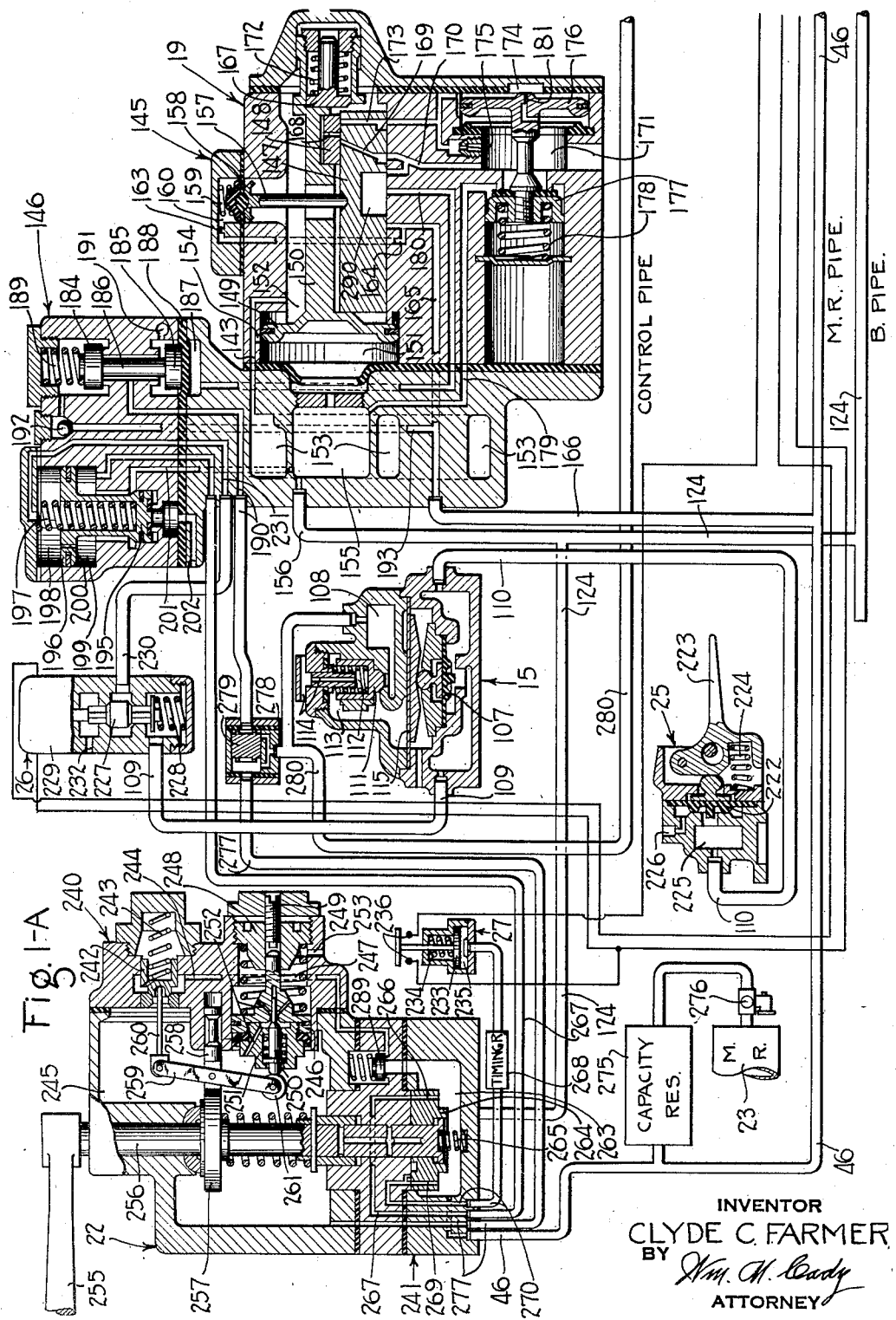
July 26, 1938.  C. C. FARMER  2,125,155
BRAKE CONTROL FOR HIGH SPEED TRAINS
Filed May 6, 1936  3 Sheets-Sheet 1
INVENTOR
CLYDE C. FARMER
BY Wm. M. Cady
ATTORNEY

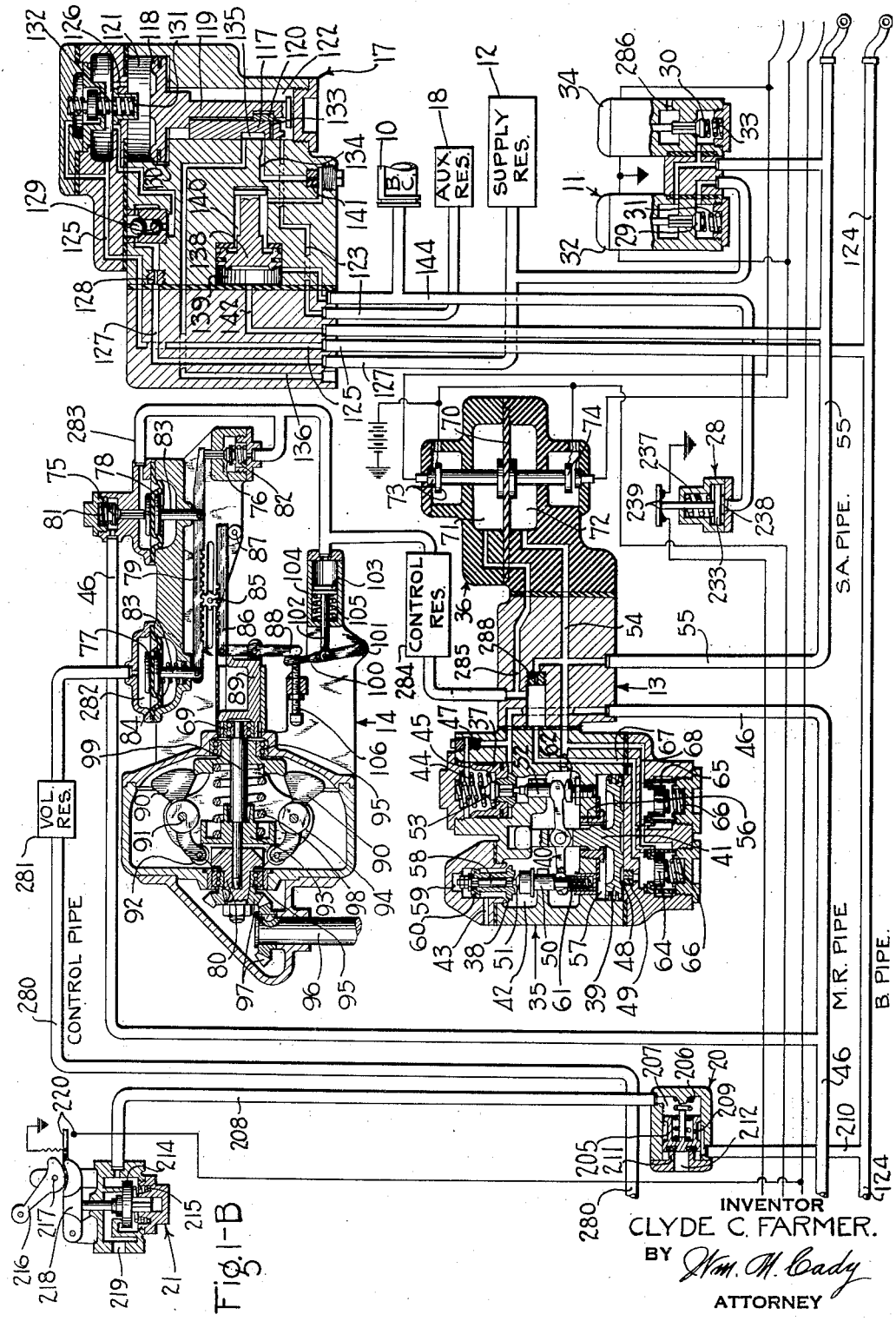

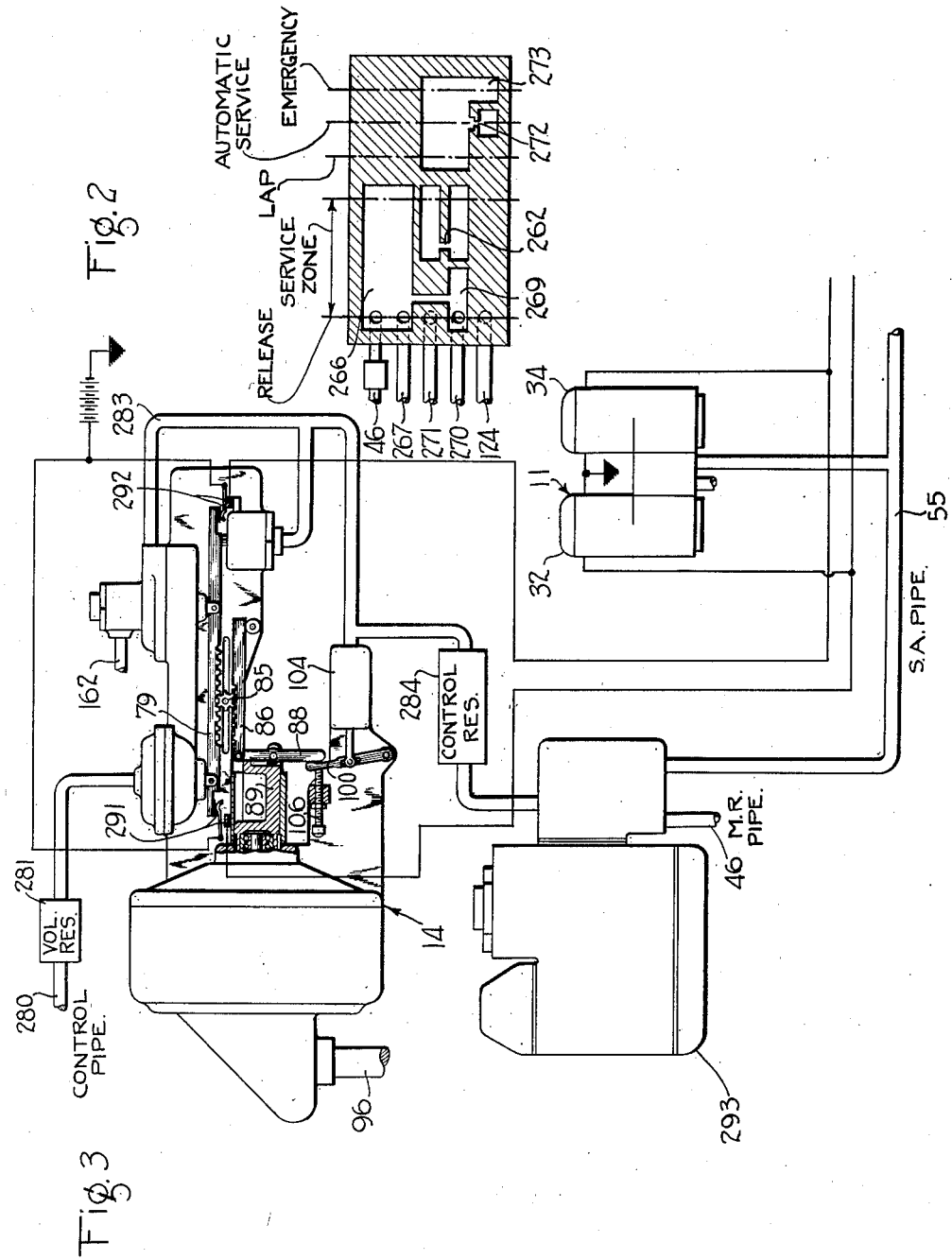

2,125,155

UNITED STATES PATENT OFFICE 2,125,155

BRAKE CONTROL FOR HIGH SPEED TRAINS

Clyde C. Farmer, Pittsburgh, Pa., assignor to The Westinghouse Air Brake Company, Wilmerding, Pa., a corporation of Pennsylvania Application May 6, 1936, Serial No. 78,079

27 Claims. (Cl. 303—21)

This invention relates to a brake control for high speed trains, and in particular to a brake control wherein the braking of a train is controlled with relation to the speed of the train.

The most common type of brake at present employed to stop railway trains is the friction type brake, comprising brake shoes operating on the treads of the vehicle wheels. The braking produced on the wheels is of course dependent upon the coefficient of friction between the brake shoes and wheel treads. It is a matter of elementary knowledge that this coefficient of friction changes with the speed of the vehicle, being relatively low at high vehicle speeds and increasing as the vehicle speed decreases, finally becoming a maximum at the end of the stop.

If the brakes are applied to a maximum degree when a vehicle is traveling at high speed then the degree of application must be reduced as the speed of the vehicle diminishes, or otherwise sliding of the vehicle wheels may result. In order to stop a vehicle or train in the shortest possible distance the degree of braking should of course not be reduced more than is necessary to avoid wheel sliding. It becomes important therefore to know exactly in what manner the coefficient of friction between brake shoes and wheel treads changes with changes in speed.

Until recently the only data available in this connection was that resulting from tests made with vehicles operating at what are now considered only moderately high speeds, none of these tests having been conducted at speeds higher than eighty miles per hour. More recently however a number of high speed trains have been placed in operation which operate at speeds in excess of one hundred miles per hour. From tests conducted with these trains in the past few years it is apparent that the degree of braking may be controlled in a manner different from that in which it is controlled on the lower speed trains. Accordingly, therefore, this invention deals with brake control means primarily intended for adaptation to trains which operate at extremely high speeds.

From recent tests it has been determined that when a train is traveling at extremely high speeds the brakes may be applied to a very high degree and maintained applied to this degree until a relatively low speed has been reached, at which time it is necessary that the degree of braking be reduced in order to avoid excessive wheel sliding, and preferably in accordance with the decrease in speed of the vehicle below this point. It is therefore a principal object of the present invention to provide a brake control system in which the initial degree of braking is maintained throughout a predetermined speed range and then the degree of braking thereafter diminished in accordance with further decrease in vehicle speed below a chosen point.

As a further result of the tests conducted on high speed trains it has been determined that the initial degree of braking should not exceed a value corresponding to the initial speed at the time of application of the brakes. That is, while the initial degree of braking may be a maximum for the maximum speed it should be lower for lower initial speeds. It has also been determined that this lower initial degree of braking may be maintained constant until a speed has been reached which is lower than that to which a higher degree of braking may be maintained constant from a higher initial speed.

For example, if we assume that the brakes may be applied to a maximum degree when the train is traveling at one hundred miles an hour and that this degree may be maintained constant until a speed of forty miles per hour is reached, then if the brakes are applied at seventy-five miles per hour to the maximum degree permitted for this initial speed, then this latter degree may be maintained constant until a speed lower than forty miles per hour, as for example thirty miles per hour, is reached. In other words, the low speed at which it is necessary to reduce the brake cylinder pressure from its constant value has a more or less definite relation to the initial speed at which the brakes are applied.

It is therefore a further object of the present invention to provide a brake control system in which the maximum initial degree of application of the brakes is made dependent upon the initial speed at the time of application, and this degree of braking maintained throughout a speed range which is likewise dependent upon the initial speed.

There have heretofore been designed and installed on high speed trains several types of brake equipments designed primarily to meet the conditions under which these trains operate. A good example of one of such brake equipments is that described and claimed in the pending application of Ellis E. Hewitt for a Brake equipment, filed August 23, 1934, Serial No. 741,063. Incorporated in that brake equipment are a number of features which have not only proved successful in actual practice but are necessary to safety as a part of any high speed train brake equipment. Accordingly therefore, and without enumerating these features in detail, it is a further object of the present invention to incorporate in a brake equipment in connection with the features heretofore set forth certain of the more desirable features described in the brake equipment of the Hewitt application.

Further and more specific objects, dealing with specific constructions and arrangements of parts, will be more fully understood from the following description which is taken in connection with the attached drawings, wherein, Figs. 1—A and 1—B, taken together, illustrate in schematic and diagrammatic form one embodiment of my invention.

Fig. 2 shows in diagrammatic form the communications established by the rotary valve of the brake valve device shown to the upper left of Fig. 1—A.

Fig. 3 illustrates in fragmentary form a modification of the embodiment shown in Figs. 1—A and 1—B.

Referring now to the embodiment of Figs. 1—A and 1—B, sufficient parts have been shown only for the head end or control car of a train, but, as will be more fully pointed out later, by the mere duplication on trailer cars of certain of the parts illustrated a complete train braking equipment results.

In this embodiment, only one brake cylinder 10, for operating a conventional type of friction brake, has been shown, but obviously any other number may be employed. The braking equipment illustrated comprises a straight air or electropneumatic portion, and an automatic portion.

The straight air or electropneumatic portion comprises a magnet valve device 11, a supply reservoir 12, a master relay device 13, a speed controlled governor device 14, and a cut-off valve device 15.

The automatic portion comprises a control valve device 17, an auxiliary reservoir 18, an emergency valve device 19, an application valve device 20, and a conductor's valve device 21.

A brake valve device 22 is provided for controlling applications of the brakes from the operator's cab. A main reservoir 23 provides a main source of supply of fluid under pressure.

Also forming a part of the brake equipment is a safety control comprising a foot valve device 25, a magnet valve device 26, and two switch devices 27 and 28.

Considering now these devices more in detail, the magnet valve device 11 comprises an application valve 29 and a release valve 30. The application valve 29 is urged toward seated position by a spring 31 and toward unseated position by an electromagnet 32 when energized. Similarly, the release valve 30 is urged toward seated position by a spring 33 and toward unseated position by a release electromagnet 34 when energized.

This magnet valve device 11 controls during straight air or electropneumatic operation the supply of fluid under pressure to and its release from brake cylinder 10, as will be more fully described later. In practice, a relay valve is usually interposed between the magnet valve device 11 and the brake cylinder 10 but this has been omitted because conventional.

The master relay device 13 comprises a relay valve section 35 and a switch section 36.

The relay valve section 35 is embodied in a casing containing a supply valve 37 and a release valve 38, both of which are operated by a piston 39 through a lever 40 pivotally mounted intermediate its ends to piston stem 41. The parts are illustrated in their release position, in which position the release valve 38 is unseated to connect chamber 42 to the atmosphere by way of passage 43. Supply valve 37 is at this time held seated by the combined pressure of spring 44 and the pressure of fluid in chamber 45. Chamber 45 is in constant open communication with main reservoir pipe 46 by way of choked passage 47.

When fluid under pressure is supplied to piston chamber 48 by way of choke 49 piston 39 is actuated upwardly, whereupon lever 40 will fulcrum about its right end to actuate plunger 50 upwardly. As this plunger moves upwardly it first seats a release pilot valve 51, and then seats the main release valve 38. The lever 40 then fulcrums about its left end to move a second plunger 52 upwardly. As this plunger moves upwardly it first unseats a supply pilot valve 53. Unseating of this pilot valve permits fluid under pressure in chamber 45 to escape to chamber 42, so that the supply valve 37 is unloaded and may be unseated by a relatively small force. Further upward movement of plunger 52 then results in engagement with the main supply valve 37, quickly unseating it. Fluid under pressure may then flow from the main reservoir pipe 46 to chamber 42.

From chamber 42 fluid under pressure flows to a passage 54 connecting with a straight air pipe 55. Flow also takes place through a small port 56 to chamber 57 above the piston 39. When the pressure in chamber 57 substantially equals or slightly overbalances the pressure in chamber 48 piston 39 will move downwardly until the supply valve 37 is seated. The supply to chamber 42 is then lapped.

When fluid under pressure is subsequently released from piston chamber 48 the piston 39 moves further downwardly, whereupon lever 40 fulcrums about its right end and moves plunger 50 downwardly to unseat the release pilot valve 51. Unseating of this pilot valve permits fluid under pressure to escape past the stem 58 to chamber 59, from which it may flow by way of small port 60 to the atmosphere through passage 43. However, the pressure in chamber 59 becomes substantially equal to that in chamber 42 so that the pressures acting on both ends of the main release valve body become nearly balanced, thus permitting the main release valve to be unseated quickly under action of a light force provided by downward movement of plunger 50. Chamber 42 will then be vented directly to the atmosphere.

The left end of lever 40 eventually comes to rest against a spring stop 61, while the right end rests upon an adjustable stop 62, which permits adjustment according to desired operation.

Associated with the relay valve section 35 are two check valves 64 and 65, each of which is urged to a seated position by a spring 66. The check valve 64 is adapted to permit the flow of fluid from passage 67 to passage 68 upon a predetermined differential of pressures therebetween, while the check valve 65 is adapted to permit flow in the reverse direction upon a similar predetermined differential therebetween in the opposite direction.

The switch section 36 is preferably embodied in a casing comprised of some electrically insulating material, such for example as hard rubber, bakelite or the like. Contained in the casing is a diaphragm 70 which is subject on one side to pressure of fluid in a chamber 71 and on the other side to pressure of fluid in a chamber 72. Secured to the diaphragm is an upper stem forming one of a set of release contacts 73, and a lower stem forming one of a set of application contacts 74.

The release contacts 73 are normally held closed by the resiliency of the diaphragm. When fluid under pressure is supplied to the chamber 71 the diaphragm is flexed downwardly to open these release contacts and to then close the application contacts. When fluid under pressure is subsequently supplied to chamber 72 to a degree slightly below the pressure in chamber 71 the diaphragm will be flexed upwardly to open the application contacts. If the pressure in chamber 72 equals that in chamber 71 then the release contacts will be closed.

The speed controlled governor device 14 includes a supply valve 75 and a release valve 76, the operation of which is controlled by diaphragms 77 and 78 through a beam 79, as modified by action of a centrifuge device 80. Supply valve 75 is urged toward seated position by a spring 81, and the release valve 76 is similarly urged toward a seated position by a like spring 82. The diaphragm 78 is adapted to operate directly the supply valve 75, while both diaphragms 77 and 78 are connected by stems 83 to the beam 79 to operate the release valve 76. A spring 84 urges the diaphragm 77 upwardly.

The beam 79 has a gear rack thereon with which meshes a pinion 85 forming a movable fulcrum for the beam. This pinion is movable back and forth by movement of a movable rack 86. This movable rack rolls on a roller 87 and is pivotally connected to a lever 88 which is adapted to move the rack back and forth.

The lever 88 is pivotally mounted intermediate its ends on a pin carried in vertical slots in a cross-head 89 forming a part of the centrifuge device 80. This centrifuge device comprises weights 90 carried by arms pivotally mounted at 91 and terminating in rollers 92 adapted to engage an abutment 93. The weights 90 are supported from a body 94 which rolls in bearings 95 at a speed proportional to the speed of the vehicle, by virtue of coupling to a shaft 96 through bevel gears 97. The shaft 96 is in turn suitably coupled to a vehicle axle, a vehicle wheel, an auxiliary tracer wheel rolling on a track rail, or any other part which rotates according to the speed of the vehicle.

As the body 94 rotates the weights 90 fly outwardly proportional to the speed and actuate the abutment 93 to the right against the bias of spring 98. This slides a shaft 99 to the right and through a coupling including a ball bearing 69 correspondingly moves the cross-head 89. Movement of the cross-head to the right positions the pinion 85, and hence the fulcrum for the beam 79, according to vehicle speed.

Now when the vehicle speed diminishes it is desired that movement of the pinion 85 to the left shall lag the movement of the cross-head 89 to the left, over a chosen speed range, and to accomplish this there is provided an arm 100 pivotally mounted at 101 and secured intermediate its ends to a stem 102 attached to a piston 103 in a cylinder 104. A spring 105 urges the piston 103 and arm 100 to the right, but when fluid under pressure is supplied to the cylinder 104 the arm 100 is positioned to the left against an adjustable stop 106. It will thus be seen that as the cross-head 89 moves to the left, with fluid pressure in cylinder 104, the pinion 85 will remain in the position to which it has been previously actuated by movement of the cross-head to the right, until the lower end of the lever 88 engages the upper end of the arm 100, and thereupon the pinion 85 will be shifted to the left.

When, however, fluid under pressure has not been supplied to the cylinder 104 the pinion 85 will move back and forth co-extensive with movement of the cross-head 89.

The cut-off valve device 15 is embodied in a casing containing a valve 107 adapted to be actuated to seated position upon supply of fluid under pressure to a chamber 108 to a predetermined degree, to cut off communication between two pipes 109 and 110. When fluid under pressure is supplied to the chamber 108 to the aforementioned predetermined degree, it acts upon the exposed area of a valve 111 and actuates this valve upwardly against the bias of a spring 112 to an upper seated position. This closes communication between a chamber 113 and the atmosphere, which communication is by way of passages 114, and establishes communication between the chamber 108 and chamber 113. The pressure of fluid thus supplied to the chamber 113 acts upon a diaphragm 115 to seat the valve 107.

The control valve device 17 is embodied in a casing containing a main slide valve 117 and a graduating slide valve 120 operated by a piston 118. The piston 118 has a stem 119 which as shown is adapted to engage the main slide valve 117 after a lost motion movement, and which is also adapted to move the graduating valve 120 co-extensive with movement of the piston 118.

The piston 118 is subject on its uppermost side to pressure of fluid in a chamber 121 and on its lowermost side to pressure of fluid in the slide valve chamber 122. The slide valve chamber 122 is connected by way of pipe and passage 123 to the auxiliary reservoir 18, while the piston chamber 121 is in direct communication with a brake pipe 124 by way of pipe and passage 125 and port 126. The chamber 121 is also in one-way communication with the supply reservoir 12 by way of pipe and passage 127, a choke 128 and two ball valves 129. The ball valves permit flow of fluid from the piston chamber to the supply reservoir but prevent flow in the opposite direction. Two ball valves are used to provide double protection.

The parts of the control valve device are shown in release position, in which position the two chambers 121 and 122 are in communication by way of feed groove 130, so that the auxiliary reservoir 18 is charged from the brake pipe. When a reduction of brake pipe pressure is effected the overbalancing pressure in slide valve chamber 122 will actuate the piston 118 upwardly. If the reduction takes place at a service rate the piston will be arrested by graduating stop 131, but if the reduction takes place at an emergency rate spring 132 behind this stop will be compressed and the piston will move until it engages the gasket at the upper end of the chamber.

If the piston is arrested by the graduating stop 131 port 133 in slide valve 117 will be in communication with a passage 134 having a restriction therein, as shown, and graduating valve 120 will have uncovered the slide valve port. If the piston 118 has compressed the graduating spring 132, then the slide valve 117 will have moved upwardly far enough to uncover the passage 134. When the piston 118 moves back to the release position shown, the passage 134 is connected by cavity 135 to an exhaust passage 136.

Contained in the casing of the control valve device 17 is a double check valve comprising a piston valve 138 subject on its left hand side to pressure of fluid in a chamber 139 and on its right hand side to pressure of fluid in a chamber 140. The chamber 140 is in communication with the previously mentioned passage 134 by way of a choke 141. The chamber 139 is in communication with the straight air pipe 55 by way of passage 142. The purpose of the piston valve 138 is to connect the passage 134 or the passage 142 to pipe 144 leading to the brake cylinder 10 and switch device 28, depending upon in which of the two chambers 139 and 140 the pressure is the greater. The choke 141 is interposed in the passage 134 for the purpose of normally delaying the flow to the chamber 140 so that if supply to the two passages 134 and 142 is effected simultaneously then the pressure in the chamber 139 will normally predominate, as will be readily apparent from the arrangement shown.

The emergency valve device 19 comprises a main section 145 and a pilot or application valve section 146.

The main section 145 is embodied in a casing containing a main slide valve 147 and a graduating valve 148, both of which are operated by a piston 149. The piston 149 is provided with a stem 150, which as shown is adapted to move the main slide valve 147 with a lost motion movement and to move the graduating valve 148 co-extensive with movement of the piston.

The piston 149 is subject on its left hand side to pressure of fluid in a chamber 151 and on its right hand side to pressure of fluid in a slide valve chamber 152. The slide valve chamber 152 is in communication with a quick action chamber 153 by way of passage 143, and is in communication with the piston chamber 151 in the release position of the piston 149, as illustrated, by way of port 154. The piston chamber 151 is in communication with the brake pipe 124 by way of chamber 155 and branch pipe 156.

In order that the main slide valve 147 shall be held firmly upon its seat, there is provided a stem 157 pressing on top of the slide valve. This stem is urged downwardly by a diaphragm 158 which is subject on its upper side to the combined pressure of a spring 159 and fluid in a chamber 160. The chamber 160 is in communication with main reservoir pipe 46 by way of choke 163, passages 164 and 165, and branch pipe 166.

When a reduction of pressure takes place in piston chamber 151 at a service or lesser rate the overbalancing pressure in the slide valve chamber 152 will cause the piston 149 to move to the left. This movement will be arrested when a tail stop 167 engages the right hand end of the main slide valve 147, at which time a port 168 in the graduating valve 148 registers with a port 169 in the main slide valve. Piston 149 also blanks port 154 at this time. The main slide valve port 169 is at this time in registration with a seat passage 170 leading to the atmosphere by way of chamber 171. This communication to the atmosphere is designed to reduce the pressure in slide valve chamber 152, and quick action chamber 153, at substantially the same rate as pressure is reduced in the piston chamber 151 during a service reduction in brake pipe pressure. The main slide valve 147 is therefore not shifted from its release position during a service or lesser rate of reduction in brake pipe pressure.

When, however, the pressure in piston chamber 151 is reduced at an emergency rate the overbalancing pressure in slide valve chamber 152 is sufficient to compress tail spring 172 behind the tail stop 167 so as to move graduating valve 148 to a position where it uncovers passage 173 in the main slide valve. This establishes a communication from the slide valve chamber to a piston chamber 174 in a vent valve device in the lower part of the casing. Communication is also established to the atmosphere by way of a choke 175, but the build up of pressure in piston chamber 174 is great enough to shift piston 176 to the left and thereby unseat a vent valve 177 against the bias of a seating spring 178. This opens a large communication between the piston chamber 151 and the atmosphere by way of passage 179.

Thus the pressure in chamber 151 is quickly reduced, so that piston 149 will be shifted to its extreme left hand position, carrying with it the main slide valve 147. Movement of the main slide valve interrupts a communication between a passage 180 and the passage 170 leading to the atmosphere, and reconnects by cavity 290 the passage 180 to the aforementioned passage 165 leading to the main reservoir pipe.

Because when the piston 149 is moved to its extreme left hand position the slide valve chamber 152 is disconnected from the piston chamber 151, eventually all of the fluid in the slide valve chamber 152 and quick action chamber 153 will be vented to the atmosphere through the choke 175 and also through the restricted port 181 in the vent valve piston 176, so that spring 178 will seat the vent valve 177.

The aforementioned passage 180 leads to the pilot or applicaton valve section 146. This section contains an application valve 184 and a release valve 185 connected together by a stem 186. The aforementioned passage 180 leads to a chamber 187 below a diaphragm 188, and when fluid under pressure is supplied to this chamber the release valve 185 is seated and the application valve 184 unseated against the bias of spring 189. Seating of the release valve 185 closes a communication between a pipe and passage 190 and an exhaust port 191, while unseating of the supply valve 184 establishes communication between the pipe and passage 190 and the main reservoir pipe 46, by way of ball valve 192, passages 193 and 165, and the aforementioned pipe 166.

Also contained in the application valve section 146 is a vent valve 195 operated by a piston 196. The piston 196 is subject on its upper side to the combined pressure of a spring 197 and fluid in a chamber 198, and on its lower side to the pressure of fluid in a chamber 199. When the fluid pressures in the chambers 198 and 199 are substantially equal, as may be caused by a small port 200 in the piston 196, spring 197 will hold the vent valve 195 seated. When the fluid pressure in chamber 198 is suddenly reduced, the overbalancing pressure in chamber 199 will shift the piston 196 upwardly. This will unseat the vent valve 195 and thus disconnect a passage 201 leading to the aforementioned chamber 155 from the chamber 199 below piston 196, and reconnect the passage 201 to an exhaust port 202.

The application valve device 20 is embodied in a casing containing a valve 205 urged toward a seated position by a spring 206. A chamber 207 is in communication with the conductor's valve device 21 by way of pipe 208 and in restricted communication with the brake pipe 124 by way of restricted port 209 and pipe 210. When the pressure in chamber 207 and pipe 208 is suddenly reduced, the overbalancing pressure to the left of the valve 205, outside of its seat rib 211, will unseat the valve to vent the brake pipe to the atmosphere by way of the large exhaust opening 212. When the brake pipe pressure has been reduced substantially to zero the spring 206 will have returned the valve to seated position.

The conductor's valve device 21 is embodied in a casing containing a valve 214 which is urged toward a seated position by a spring 215, and adapted to be unseated by a clockwise rotation of a lever 216. The lever 216 is pivotally mounted at 217 and when rotated in a clockwise direction actuates an arm 218 downwardly to unseat the valve 214. This establishes communication between the pipe 208 and a large exhaust port 219. When the arm 218 is actuated downwardly it carries with it one of a pair of contacts 220 and hence closes these contacts. The contact carried by the arm 218 is of course insulated therefrom.

The foot valve device 25 is embodied in a casing having a diaphragm valve 222 which is adapted to be held in seated position by pressure manually applied to a foot pedal 223. When the pressure on the foot pedal is released a spring 224 actuates it to an upper position, permitting fluid under pressure in a chamber 225 to unseat the valve 222 and establish communication between the aforementioned pipe 110 and an exhaust port 226.

The magnet valve device 26 is embodied in a casing containing a double beat valve 227 urged toward an upper seated position by a spring 228, and adapted to be actuated to a lower seated position by an electromagnet 229 when energized. When in upper seated position the valve 227 establishes communication between a pipe 230 (leading by way of passage 231 to the chamber 198 above piston 196 in the emergency valve device) and the aforementioned pipe 109. When the double beat valve 227 is actuated to the lower seated position this communication is cut off and pipe 230 is connected to exhaust port 232.

The switch device 27 is embodied in a casing containing a piston 233 urged downwardly by a spring 234, but adapted to be actuated upwardly upon supply of fluid under pressure to a chamber 235 to open contacts 236.

The switch device 28 is embodied in a casing containing a similar piston 233 urged downwardly by a spring 237, and urged upwardly by supply of fluid under pressure to a chamber 238 to open contacts 239.

The brake valve device 22 comprises two sections, a self-lapping valve section 240 and a rotary valve section 241.

The self-lapping valve section 240 contains a supply valve 242 urged toward a seated position by a spring 243. When this valve is unseated communication is established between a passage 244 leading to the main reservoir pipe 46, as will be described presently, and a pressure chamber 245.

Operatively mounted in the valve device casing is a movable abutment 246 in the form of a piston subject on its left hand side to pressure of fluid in chamber 245 on its right hand side to pressure of a regulating spring 247. Tension on this regulating spring may be varied by turning an adjustable cap 248, as will be obvious. Movement of the abutment 246 to the right is adjustably limited by a set screw 249.

Contained interiorly of the movable abutment 246 is a release valve 250 urged toward an unseated position by a spring 251. When unseated the release valve establishes communication between the chamber 245 and the atmosphere by way of passages 252 and exhaust port 253.

The supply valve 242 and release valve 250 are actuated by manual operation of a handle 255, which is secured to a shaft 256 carrying a cam 257. The cam 257 is so designed that as the handle 255 is moved from a release position to different degrees into an application zone a plunger 258 is progressively shifted to the right. This plunger carries pivotally mounted intermediate their ends a pair of spaced levers 259. These levers carry between their uppermost ends a stem 260 adapted to engage the supply valve 242, and between their lower ends a roller 261 adapted to engage the stem of the release valve 250.

As the handle 255 is moved into the application zone, the release valve 250 is first seated by movement of the spaced levers 259, and then the spaced levers fulcrum about their lower end to unseat the supply valve 242. Springs 243, 251 and 247 are designed to permit this sequence. When the supply valve 242 is unseated fluid under pressure will be supplied to the chamber 245, and the pressure of this fluid acting upon the left side of the movable abutment 246 will shift this abutment to the right, whereupon the spaced levers 259 will fulcrum about their midpoint and permit spring 243 to shift the supply valve toward seated position. The parts are so designed that the pressure established in chamber 245 corresponds to the degree or extent of movement of the handle 255 into the application zone.

The rotary valve section 241 contains a chamber 263 having disposed therein a rotary valve 264 adapted to be operated by and co-extensive with movement of the handle 255.

This rotary valve is normally held seated by a spring 265 and also by the pressure of fluid in chamber 263 which is directly connected to the main reservoir pipe 46. In the release position of the handle 255, as well as for all positions of the handle in the service zone, the chamber 263 is maintained connected by port 266 in the rotary valve to pipe and passage 267, (see Fig. 2) which lead to the chamber 199 below piston 196 in the emergency valve device.

Also, for release position of the handle 255 and for positions of the handle in the service zone up to a chosen service position, the chamber 263 is maintained in communication with a timing reservoir 268 through port 269 in the rotary valve and pipe and passage 270. When the handle 255 is actuated to and beyond this predetermined service position, the timing reservoir 268 is disconnected from chamber 263 and connected by a restricted port 262 to an exhaust passage 271, so that the pressure of fluid in the timing reservoir 268 is gradually reduced to zero.

In addition to the release position of the handle 255 and various positions in a service zone, there are provided three additional positions, a lap position, an automatic service position, and an emergency position (see Fig. 2). In the automatic service position the plunger 258 in the self-lapping section 240 will have been actuated to its extreme position to the right, while in the rotary valve section the pipe 267 is disconnected from the chamber 263 and the brake pipe 124 connected to the atmosphere through a restricted port 272, which vents the brake pipe at a service rate. In the emergency position of the handle 255 the same communications are established as in the automatic service position, except that the brake pipe is vented to the atmosphere through a large port 273 at an emergency rate. The lap position is located between the end of the service zone and the automatic service position for the customary use.

The operation of this embodiment of my invention is as follows:

Running condition

When the train is running the brake valve handle 255 is maintained in the release position, and at the same time the operator maintains pressure manually applied to the foot pedal 223. In release position of the brake valve handle the system is charged as follows.

The brake pipe 124 is charged from the main reservoir pipe 46 through the pilot or application valve section 146 of the emergency valve device. This charging communication comprises beginning at the rotary valve 264 in the brake valve device, port 266, pipe and passage 267, chamber 199, passage 201, chamber 155, and branch pipe 156. From the brake pipe supply reservoir 12 will be charged by way of pipe and passage 125, past the two ball valves 129 in the control valve device 17, choke 128, and pipe and passage 127. The auxiliary reservoir 18 will be charged from the brake pipe through pipe and passage 125, piston chamber 121, feed groove 130, slide valve chamber 122, and pipe and passage 123.

It is to be here understood that each trailer car of the train will include a control valve device 17, at least one brake cylinder 10, a magnet valve device 11, an auxiliary reservoir 18 and a supply reservoir 12. The auxiliary and supply reservoirs on each trailer car will then be charged from the brake pipe as just described.

In the emergency valve device 19, which is supplied only on the head end car, the quick action chamber 153 and slide valve chamber 152 will be charged through the port 154.

The main reservoir 23 is of course maintained charged from a compressor (not shown), and in order to add capacity to the system a capacity reservoir 275 is connected between the main reservoir and the main reservoir pipe 46. In addition, a feed valve device 276, of conventional design, is employed to maintain the pressure in the main reservoir pipe at some predetermined value.

Also, in release position of handle 255, the timing reservoir 268 is maintained charged through port 269 in the rotary valve. When the timing reservoir is charged the switch device 27 will hold its contacts 236 open.

With the brake system charged in the release position of the brake valve handle as described, the other parts of the brake equipment will be in the positions illustrated. The brake cylinder on each car will then be maintained connected to the atmosphere and the brakes thus held released.

Service application by straight air operation

Service applications of the brakes are normally effected through straight air operation of the brake equipment. This is accomplished by moving the brake valve handle 255 into the service zone to a degree or extent according to the desired degree of braking. When the brake valve handle is thus moved fluid under pressure will be supplied to the pressure chamber 245 to a degree according to the extent of movement of the handle, as previously described. The brake pipe pressure will not be disturbed when the handle is in the service zone.

From the pressure chamber 245, fluid under pressure flows through pipe and passage 277 to a double check valve device 278. The pressure of the fluid shifts a valve 279 therein to its right hand position, and fluid then flows to a control pipe 280 as well as to chamber 108 in the cut-off valve device 15. From the control pipe 280 the flow is to a volume reservoir 281 and from thence to chamber 282 in the speed controlled governor device 14. The volume reservoir 281 is provided to permit graduating the pressure in the control pipe in finer increments.

Fluid under pressure supplied to the chamber 282 actuates the diaphragm 77 downwardly against the bias of spring 84. This rocks the beam 79 about the fulcrum formed by pinion 85 to permit seating of release valve 76 and to unseat the supply valve 75. Fluid under pressure then flows from main reservoir pipe 46 past the unseated supply valve 75 and through pipe 283 to a control reservoir 284, and to the cylinder 104. From the control reservoir 284 the flow is to the upper chamber 71 in the switch section 36 of the master relay device 13, by way of passage 285, and also to the relay piston chamber 48 by way of passage 67 and choke 49.

In the switch section 36 the diaphragm 70 will be actuated downwardly to open release contacts 73 and close application contacts 74. Opening of release contacts 73 interrupts the normally closed circuit shown to the release electromagnet in each of the magnet valve devices 11 throughout the train, so that each release valve 30 will be seated by spring 33. This closes communication between the straight air pipe 55 and the atmosphere, which was previously established through a port 286 in the magnet valve device.

Closing of the application contacts 74 energizes the application electromagnet in each magnet valve device 11 so that each supply valve 29 is unseated. Fluid under pressure then flows from the supply reservoir 12 on each car past the unseated supply valve 29 to the straight air pipe 55. From the straight air pipe the flow is to chamber 139 in the control valve device 17, where the pressure of the fluid shifts the piston valve 138 to its right hand position, and then continues to the brake cylinder 10 and to the switch device 28.

Fluid under pressure in the straight air pipe also flows to the lower chamber 72 in the switch section 36. When the pressure in this lower chamber 72 reaches a value slightly below that in the upper chamber 71, the diaphragm 70 will be actuated upwardly to open application contacts 74. This will cut off the supply of fluid under pressure to the straight air pipe, and thus lap the brake application.

Now the maximum degree to which fluid under pressure may be supplied to the upper chamber 71 in the switch section 36 depends both upon the degree of fluid under pressure supplied to the control pipe 280 from the brake valve device and on the speed of the vehicle. The speed of the vehicle affects the pressure as follows.

At the instant the brakes are applied the position of pinion 85 will correspond to the speed of the vehicle. As will be obvious, when this fulcrum point is in its extreme right hand position the effective moment arm of that portion of the beam 79 to the left of the fulcrum will be greater than the effective moment arm to the right. Thus the pressure established in pipe 283 and control reservoir 284 will bear a relation to the pressure in control pipe 280 and volume reservoir 281 according to the ratio of these two moment arms. When the pressures in the two pipes correspond to this ratio the diaphragm 78 will be actuated downwardly to permit seating of the supply valve 75 by spring 81.

Fluid under pressure flowing to the cylinder 104 actuates the piston 103 therein to the left, and this positions the arm 100 against the stop 106. The parts are so designed that when the crosshead 89 moves to the left with diminishing speed of the vehicle due to application of the brakes, the pinion 85 is not immediately moved therewith, but the crosshead 89 alone is moved until the lever 88 carried thereby has been rotated sufficiently for its lower end to engage the arm 100. When this takes place the rack 86 will then be moved to the left carrying with it the pinion 85.

Thus it will be seen that the maximum degree to which the brakes may be applied is governed by the speed of the vehicle at the time of application, and this degree of application will be maintained substantially constant until a lower speed is reached, at which time due to the shifting of the fulcrum point 85 the degree of application will be reduced. When the train comes to rest it is preferred that the moment arms on either side of pinion 85 be equal, so that the pressure in pipe 283 and control reservoir 284 be equal to that in control pipe 280 and volume reservoir 281.

The speed at which the speed controlled governor device begins to reduce brake cylinder pressure depends upon the initial speed at the time the brakes are applied. This is inherent in the design of the parts. From a given initial speed at the time of application of the brakes the lever 88 will be rotated through a given angle before it strikes the stop arm 100. For other initial speeds this angle is different. This causes the speed range through which brake cylinder pressure is held constant, and consequently the low speed at which brake cylinder pressure is reduced, to vary as a function of the speed at the instant of initiating the brake application. For example, let it be assumed that when the brakes are applied at a train speed of one hundred miles per hour the brake cylinder pressure is maintained constant until a speed of approximately forty miles per hour is reached, whereupon the speed controlled governor device begins to reduce the brake cylinder pressure according to speed. If however the train speed is seventy-five miles per hour at the time the brakes are applied, then the brake cylinder pressure will be maintained substantially constant until some speed below forty miles per hour, as for example thirty miles per hour, is reached before the brake cylinder pressure will be reduced.

Tests with high speed trains have shown that while a high brake cylinder pressure is permissible at high speeds it cannot be maintained to as low a speed as when the initial brake cylinder pressure is lower, without causing wheel sliding. The governor device therefore automatically determines the speed at which it is necessary to reduce the brake cylinder pressure, and the parts are preferably so designed as to take advantage of the full speed range over which the initial brake cylinder pressure may be maintained.

As aforestated, fluid under pressure supplied to the control reservoir 284 flows by way of the choke 49 to the relay piston chamber 48. Due to the presence of this choke the build up of pressure in piston chamber 48 takes place at a relatively slow rate. The switch section 36 therefore functions to establish pressure in the straight air pipe 55 before the relay piston 39 will have been actuated upwardly, and fluid under pressure in the straight air pipe flows to chamber 57 above relay piston 39 and holds the piston in its lap position, where release valves 38 and 51 are both held seated.

If however for any reason the magnet valve devices 11 throughout the train should fail to function to supply fluid under pressure to the straight air pipe 55, then the piston 39 will be actuated to application position to supply fluid under pressure to the straight air pipe. From the straight air pipe fluid under pressure will flow to the brake cylinder as before described. Thus due to the parallel arrangement of the electro-pneumatic and pneumatic portions, as shown, an application of the brakes is assured during straight air or service applications.

It will be noted that in the master relay device 13 there is provided a choke 288 which establishes a restricted communication between the control reservoir 284 and the straight air pipe 55. This choke has an opening too small to permit a very rapid flow between the control reservoir and straight air pipe, but if for any reason both the electropneumatic and the pneumatic portions described are rendered inoperative there would ultimately be established sufficient pressure in the straight air pipe to stop the train. There is thus a triple assurance that the train will be ultimately stopped.

When fluid under pressure flows from the control reservoir 284 to the relay piston chamber 48, it also flows to the seat of the check valve 64. When the pressure acting above this check valve has reached a predetermined value, the check valve will be unseated and fluid will then flow through passages 68 and 54 to the lower switch chamber 72. This flow takes place at the same time as the flow from the control reservoir to the upper chamber 71.

The purpose of this arrangement is to provide for increased sensitivity of the switch section. In order that the switch section shall be made promptly responsive to differential pressures acting upon the diaphragm 70, the parts must be made relatively light. Therefore the differential pressures which may be applied to the diaphragm should be limited to some predetermined low value which will not place undue strains on the parts. The spring pressure acting on the check valve 64 is therefore so proportioned that when an application of the brakes is effected the maximum differential of pressure which acts upon the diaphragm is limited to a predetermined low value which however is sufficient to actuate the diaphragm but low enough not to damage the parts.

Similarly, in releasing the brakes following an application the spring acting upon the check valve 65 limits the differential of pressure which may act upon the diaphragm from below, because as soon as the pressure in the upper chamber 71 is reduced and a small differential produced, check valve 65 will unseat to prevent an increase in the differential.

It will thus be seen that the two check valves 66 and 65 function to limit the differential of pressure acting upon the diaphragm 70. Actually then when fluid under pressure flows from the straight air pipe 55 to the lower chamber 72 it merely reduces the differential acting upon the diaphragm from above.

Further, when the pressure in the supply reservoir 12 has equalized with that in the brake cylinder 10, and a relay valve device is interposed between the reservoir and brake cylinder, the pressure of fluid supplied to the under side of the relay valve piston from the control reservoir 284, due to a connection being established between the control reservoir and the straight air pipe by unseating of the check valve 64, may be so greatly in excess of that in the supply reservoir at this time that the relay valve piston cannot lap the supply to the brake cylinder. To prevent this and to insure that the relay piston can move to lap position in such a condition the check valve 289 is provided in the brake valve device 22.

From Fig. 2 it will be noted that as the brake valve handle 255 is moved through the first portion of the service zone the timing reservoir 268 is maintained connected to chamber 263. However when the brake valve handle is moved past a certain point in the service zone the timing reservoir is vented to the atmosphere through restricted port 262. After a definite time interval the pressure in the timing reservoir will be reduced sufficiently for the switch device 27 to close its contacts 236.

As may be seen from the circuit arrangement shown, closing of these contacts will establish a circuit to the magnet valve device 26, which circuit includes the contacts 239 of the switch device 28. If however in the meanwhile sufficient brake cylinder pressure has been established so as to cause contacts 239 of the switch device 28 to open, the magnet valve device 26 will not be energized. But should the magnet valve device 26 be energized an emergency application of the brakes will be effected, as will more fully hereinafter appear.

When it is desired to effect a release of the brakes following a straight air service application, the brake valve handle 255 is returned to the release position. In this position the supply valve 242 will be seated and the release valve 250 unseated. Fluid under pressure will then be released from the control pipe 280 and volume reservoir 281 to the atmosphere, and this will cause a corresponding release of fluid under pressure from the control reservoir 284. The switch section 34 will then operate the magnet valve devices 11 throughout the train to cause a like release of fluid under pressure from the brake cylinders.

Service application by automatic operation

If for any reason the straight air portion of the brake equipment should be rendered inoperative, then service application may be effected by automatic operation. To effect this type of application, the brake valve handle 255 is turned to the automatic service position, where the brake pipe 124 is vented to the atmosphere at a service rate to the desired degree, and then the handle is turned to the lap position. As before explained, service reductions in brake pipe pressure will not cause an effective operation of the emergency valve device 19.

However, in the control valve device 17 the piston 118 will move upwardly until it engages the graduating stop 131. Fluid under pressure will then be supplied from the auxiliary reservoir 18 to the connected brake cylinder 10, through the communication before described for a service operation of the control valve device, the piston valve 138 shifting to the left to open the communication. The degree of the brake application will of course correspond to the degree of brake pipe reduction, as in conventional brake systems. It is preferred that this degree be such that sliding of the wheels will not be likely even for a full application.

When it is desired to effect a release of the brakes following an automatic service application, the brake valve handle is turned to the release position, in which position, as will be noted in Fig. 3, the brake pipe is again connected to the main reservoir pipe and recharged. The control valve device 17 will then function to connect the brake cylinder to the atmosphere.

Emergency application

When it is desired to effect an emergency application of the brakes the brake valve handle 255 is turned to and left in the emergency position. In this position of the brake valve handle the plunger 258 is actuated to its extreme right hand position and at the same time the rotary valve 264 is operated to disconnect pipe 267 from chamber 263 and to connect the brake pipe 124 to the atmosphere through the enlarged port 273.

Movement of the plunger 258 to its extreme right hand position functions to supply fluid under pressure to the pressure chamber 245 to the maximum possible degree. Connection to the atmosphere through the enlarged port vents the brake pipe at an emergency rate.

When brake pipe pressure is reduced at an emergency rate the emergency valve device functions to shift the main slide valve 147 to application position, so that cavity 290 connects the two passages 165 and 180. At the same time, the vent valve 177 is unseated to accelerate brake pipe reductions throughout the train. When the passages 165 and 180 are connected, fluid under pressure flows from the main reservoir pipe through pipe 166, and the two passages 165 and 180, to chamber 187 below the diaphragm 188. The pressure of this fluid causes seating of the release valve 185 and unseating of the supply valve 184. Fluid under pressure then flows from the main reservoir pipe past the unseated supply valve 184 and through pipe and passage 190 to the double check valve device 278. The pressure of this fluid shifts the valve 279 to its left hand position and then flows to the control pipe 280. Since the control pipe is thus connected directly to the main reservoir pipe the maximum pressure therein will be established.

It will be noted that fluid flows to the double check valve 278 both from the brake valve device 22 and from the emergency valve device 19. It is intended that the pressure of the flow from the emergency valve device shall predominate, because of the presence of the check valve 289 in the brake valve device 22, and control pipe pressure will therefore correspond to main reservoir pipe pressure.

Fluid under pressure in the control pipe 280 flows to the speed controlled governor device 14 to cause the operation thereof in the manner as aforedescribed for a straight air service application.

In the control valve device 17 the emergency reduction in brake pipe pressure causes the piston 118 to move upwardly and compress the graduating spring 132. Fluid under pressure will then flow from the auxiliary reservoir to the chamber 140 to the right of the double check valve 138. This flow however takes place through a restricted passage 134 and choke 141, and consequently the pressure in the chamber 140 builds up slower than that in the chamber 139. Although the application is initiated by automatic operation the straight air or electropneumatic portion is in reality effective in producing the application of the brakes, the automatic portion functioning merely to insure an application of the brakes in case of failure of the straight air portion.

The speed controlled governor device 14 functions as before described to maintain a substantially constant brake cylinder pressure until a low speed is reached, and to thereafter reduce the brake cylinder pressure in accordance with reductions of speed below this point.

*Special emergency application*

As before explained, if when effecting a straight air or electropneumatic service application, a predetermined brake cylinder pressure is not produced within a predetermined time then the magnet valve device 26 will be energized. When this device is energized and its double beat valve 227 is actuated to lower seated position, the chamber 198 above piston 196 in the emergency valve device is vented to the atmosphere. This will cause piston 196 to move upwardly to connect the chamber 155 to the atmosphere. A reduction of pressure in chamber 155, and consequently that in piston chamber 151, will take place at an emergency rate whereupon the emergency valve device will function to initiate an emergency application of the brakes.

An emergency application of the brakes may also be effected by rotation of the lever 216 of the conductor's valve device 21. When this is done the valve 214 will be unseated to vent the brake pipe to the atmosphere at an emergency rate.

At the same time, closing of contacts 220 will energize the magnet valve device 26 to accelerate operation of the emergency valve device 19. The emergency valve device will then supply fluid under pressure to a maximum degree to the control pipe 280, with the result that the speed controlled governor device 14 will assume control of the application.

*Operation of safety feature*

When the train is running, the operator maintains pressure manually applied to the foot pedal 223. If through accident or design the operator should release this pressure, then diaphragm valve 222 will be unseated to vent the pipe 110 to the atmosphere. This will result in upward movement of piston 196 in the emergency valve device to effect an emergency application as previously described.

When a service application of the brakes is effected by movement of the brake valve handle 255 into the service zone, fluid under pressure is supplied to the chamber 108 in the cut-off valve device 15, as before stated. When this pressure has attained a predetermined value and thus raised the valve 111 to flow to chamber 113, valve 107 will be seated to isolate the foot valve device 25. The operator may then release the pressure applied to the foot pedal 223 without effecting an emergency application of the brakes.

*Modification shown in Fig. 3*

In this modification an arrangement is shown whereby the switch section 36 of the master relay device 13 (Fig. 1—B) may be dispensed with and the functioning of this device performed by contacts operated by the beam 79 in the speed controlled governor device 14.

As shown, a set of release contacts 292 and a set of application contacts 291 are supported by and insulated from the casing of the governor device. These contacts are adapted to be opened by the resiliency of one of the contact members. The release contacts 292 are held closed when the release valve 76 of the governor device is held unseated, while the application contacts 291 are adapted to remain open when the supply valve 75 is held seated. When fluid under pressure is supplied to chamber 282 to effect an application of the brakes, the beam 79 is rocked in a counterclockwise direction to open the release contacts and then close the application contacts. Subsequently when the supply to the pipe 283 and control reservoir 284 is lapped, both contacts are opened.

The release contacts 292 are connected to the release electromagnet in each magnet valve device 11 and the application contacts 291 are connected to the application electromagnet, as were the contacts of the switch section 36, so that operation of these contacts effects operation of the magnet valve devices 11 throughout the train in the same manner as did the switch section 36.

Since in this embodiment the switch section 36 may be dispensed with, the need for the check valves 64 and 65 is also dispensed with and these may be omitted and replaced by a cap 293, as indicated in Fig. 3.

While I have shown and described one preferred embodiment of my invention, and one modification thereof, it will be understood that many changes and modifications therein may be made and I do not wish to be limited to the specific arrangements shown, or otherwise than by the spirit and scope of the appended claims.

Having now described my invention, what I claim as new and desire to secure by Letters Patent, is:

1. In a vehicle brake system, in combination, a pipe to which fluid under pressure is supplied to effect an application of the brakes, means for controlling the degree of pressure in said pipe according to a desired degree of application of the brakes, speed responsive means for controlling the degree of pressure established in said pipe according to the speed of the vehicle, and being operable to reduce the pressure in said pipe as the speed of the vehicle diminishes, and means responsive to the pressure of fluid in said pipe for delaying effective operation of said last means.

2. In a vehicle brake system, in combination, brake controlling means having an element movable about a positionable fulcrum for controlling the degree of application of the brakes, speed responsive means for shifting the position of said fulcrum to vary the degree of application of the brakes, and means operative at the time the brakes are applied for causing the movable fulcrum to be shifted only after a predetermined decrease in the speed of the vehicle has taken place.

3. In a vehicle brake system, in combination, a fluid pressure operated switch device to which fluid under pressure is supplied to effect an application of the brakes, means for effecting a supply of fluid under pressure to said switch device to a chosen degree, speed responsive means for reducing the pressure in said switch device according to the decrease in vehicle speed, and means operable to delay the reduction of pressure in said switch device until the speed of the vehicle will have diminished to a relatively low value.

4. In a vehicle brake system, electropneumatic means for controlling applications of the brakes, contacts for controlling operation of said electropneumatic means, means for manually effecting operation of said contacts to effect an application of the brakes, and speed responsive means for effecting operation of said contacts upon a predetermined decrease in the speed of the vehicle to decrease the degree of application of the brakes.

5. In a vehicle brake system, in combination, a brake cylinder, electrical means for controlling the supply of fluid under pressure to and its release from said brake cylinder, contacts controlling operation of said electrical means, means including a movable fulcrum for controlling operation of said contacts, and speed responsive means for controlling positioning of said fulcrum.

6. In a vehicle brake system, in combination, means for effecting an application of the brakes by straight air operation and by automatic operation, means for controlling the initial degree of application of the brakes according to the speed of the vehicle at the time of application regardless of whether effected by straight air operation or by automatic operation, and means for causing the initial degree of application of the brakes to be maintained substantially constant over a predetermined decreasing speed range of the vehicle and for then at a low speed decreasing the degree of application of the brakes.

7. In a vehicle brake system, in combination, a pipe normally charged with fluid under pressure, means operated upon a reduction of pressure in said pipe for effecting an application of the brakes, means for causing the initial degree of application of the brakes to not exceed a value corresponding substantially to the speed of the vehicle at the time of application, and means operative following decrease of the vehicle speed through a chosen speed range for decreasing the degree of application of the brakes in accordance with a further decrease in vehicle speed.

8. In a vehicle brake system, in combination, a pipe normally charged with fluid under pressure, means operable upon a decrease of pressure in said pipe for effecting an application of the brakes to a degree corresponding substantially to the speed of the vehicle at the time of application, manually operative means for effecting the reduction of pressure in said pipe, and means operative subsequently at a speed lower than and determined by the vehicle speed at the time of the brake application for decreasing the degree of application of the brakes.

9. In a vehicle brake system, in combination, a brake cylinder, a pipe normally charged with fluid under pressure, means operated upon a decrease of pressure in said pipe for effecting to a chosen degree a supply of fluid under pressure to said brake cylinder, means for maintaining brake cylinder pressure substantially constant as the speed of the vehicle diminishes, and means operative at a predetermined low vehicle speed for progressively decreasing brake cylinder pressure as the vehicle speed decreases further.

10. In a vehicle brake system, in combination, a brake cylinder, a pipe normally charged with fluid under pressure, means operated upon a decrease of pressure in said pipe for effecting to a chosen degree a supply of fluid under pressure to said brake cylinder, means for maintaining brake cylinder pressure substantially constant as the speed of the vehicle diminishes, means operative at a predetermined low vehicle speed for decreasing brake cylinder pressure as the vehicle speed decreases further, and safety control means for controlling the reduction of pressure in said normally charged pipe.

11. In a vehicle brake system, in combination, a first pipe to which fluid under pressure is supplied to initiate an application of the brakes, a second pipe to which fluid under pressure is supplied proportional to the pressure in said first pipe to effect the application of the brakes, means including a movable fulcrum for determining the relation between the fluid pressures in said two pipes, means driven according to the speed of the vehicle for positioning said fulcrum at high vehicle speeds to cause the pressure in said second pipe to increase relative to the pressure in said first pipe and for positioning said fulcrum at low vehicle speeds to cause the pressure in said second pipe to decrease relative to the pressure in said first pipe, and means for delaying positioning of said fulcrum as the speed of the vehicle diminishes until a low predetermined speed has been reached.

12. In a vehicle brake system, in combination, a first pipe to which fluid under pressure is supplied to initiate an application of the brakes, electroresponsive means operable upon supply of fluid under pressure to said first pipe to effect an application of the brakes, a second pipe to which fluid under pressure is supplied when said electroresponsive means has effected the application of the brakes, and means defining a restricted communication between said first and second pipes and being adapted to permit supply of fluid under pressure from said first pipe to said second pipe to effect the application of the brakes upon failure of said electropneumatic means to effect the application.

13. In a vehicle brake system, in combination, means for effecting an application of the brakes, means operating automatically in response to vehicle speed for preventing the initial degree of application of the brakes from exceeding a maximum value corresponding substantially to the speed of the vehicle at the time of application, means for decreasing the degree of application of the brakes as the speed of the vehicle diminishes, and means for delaying the effectiveness of said last means over a predetermined speed range which is dependent upon the speed at the time of initiating the application of the brakes.

14. In a vehicle brake system, in combination, a brake cylinder, means for effecting a supply of fluid under pressure to said brake cylinder, means automatically operative responsive to vehicle speed for limiting the rise of brake cylinder pressure to a degree corresponding substantially to the speed of the vehicle at the time of initiating said supply, means for maintaining brake cylinder pressure substantially constant over a predetermined decreasing speed range of the vehicle, and means automatically operative at a vehicle speed which is dependent upon the speed at the moment of initiating the brake cylinder supply for then decreasing brake cylinder pressure substantially in accordance with a further decrease in vehicle speed.

15. In a vehicle brake system, in combination, a pipe to which fluid under pressure is supplied to effect an application of the brakes, means for controlling the degree of pressure in said pipe according to a desired degree of application of the brakes, speed responsive means automatically operated by and in response to the speed of the vehicle for limiting the degree of pressure established in said pipe according to the speed of the vehicle at the time of initiating the brake application, and operative to maintain the pressure in said pipe substantially constant as the speed of the vehicle diminishes, and means automatically operative at a speed which is dependent upon the speed at the moment of initiating the application of the brakes for diminishing the pressure in said pipe substantially in accordance with a further decrease in vehicle speed.

16. In a vehicle brake system, in combination, a pipe to which fluid under pressure is supplied to effect an application of the brakes, means for causing the pressure initially established in said pipe to be limited to a maximum degree corresponding to the speed of the vehicle at the time of initiating an application of the brakes, and operative to diminish the pressure in said pipe in accordance with the decrease in vehicle speed, and means operative responsive to the pressure in said pipe for causing said last means to delay diminishing the pressure in said pipe until a predetermined low vehicle speed has been reached.

17. In a vehicle brake system, in combination, a normally deenergized magnet valve device operable when energized to effect an application of the brakes, a switch device normally subject to fluid pressure and operated upon a decrease of fluid pressure to effect energization of said magnet valve device, safety control means normally subject to pressure manually applied by an operator and operative when said manually applied pressure is released to decrease the pressure in said switch device to cause operation thereof, and a conductor's valve device operable to effect energization of said magnet valve device independently of said fluid pressure switch device.

18. In a vehicle brake system, in combination, a brake cylinder, means including a supply valve and a release valve for controlling the supply of fluid under pressure to and its release from said brake cylinder, a manually operated brake valve device, means responsive to operation of said brake valve device for effecting the operation of said supply and release valves to effect a supply of fluid under pressure to said brake cylinder, and a device rotated according to the speed of the vehicle and having associated therewith means operated to condition said two valves before initiating the application of the brakes to limit the maximum brake cylinder pressure which may be established by manipulation of said brake valve device to a value corresponding substantially to the speed of the vehicle at the time of initiating an application.

19. In a vehicle brake system, in combination, a first pipe to which fluid under pressure is supplied to initiate an application of the brakes, a second pipe to which fluid under pressure is supplied proportional to the pressure in said first pipe to effect the application of the brakes, means including a shiftable element for determining the relation between the fluid pressure in said two pipes according to the position of said element, means driven according to the speed of the vehicle for positioning said element at high vehicle speeds to cause the pressure in said second pipe to increase relative to the pressure in said first pipe and for positioning said element at low vehicle speeds to cause the pressure in said second pipe to decrease relative to the pressure in said first pipe, and means for delaying positioning of said element as the speed of the vehicle diminishes until a low predetermined speed has been reached.

20. In a vehicle brake system, in combination, electroresponsive means operative to effect an application of the brakes, manually operated means for effecting the operation of said electroresponsive means to effect an application of the brakes, speed responsive means operative to control said electroresponsive means to prevent the degree of application of the brakes from exceeding that corresponding to the speed of rotation of an element forming a part of said speed responsive means, and means co-acting with said speed responsive means to cause said electroresponsive means to maintain the degree of brake applications substantially constant over a chosen decreasing speed range of the vehicle, and to then diminish the degree of application of the brakes according to further decrease in vehicle speed.

21. In a vehicle brake system, in combination, electroresponsive means operative to effect an application of the brakes, a fluid pressure operated switch device to which fluid under pressure is supplied to effect the operation of said electroresponsive means, manually operated means for effecting a supply of fluid under pressure to said switch device to a chosen degree, speed responsive means for reducing the pressure in said switch device according to the decrease in vehicle speed, and means operable to delay the reduction of pressure in said switch device until the speed of the vehicle will have diminished to a relatively low value.

22. In a vehicle brake system, in combination, a brake cylinder, magnet valve devices for controlling the supply of fluid under pressure to and its release from said brake cylinder, a fluid pressure operated switch device for controlling the operation of said magnet valve devices, a brake valve device, means including a movable fulcrum operative responsive to operation of said brake valve device for controlling the supply of fluid under pressure to and its release from said fluid pressure operated switch device, and speed responsive means for controlling the positioning of said fulcrum.

23. In a vehicle brake system, in combination, valve means for controlling a communication through which fluid under pressure is supplied to effect an application of the brakes, a speed responsive device driven according to the speed of the vehicle, a cross-head movable in one direction by said speed responsive device upon an increase in vehicle speed and movable in the opposite direction upon a decrease in vehicle speed, a lever for operating said valve means, a movable fulcrum for said lever, and means so constructed and arranged that as said cross-head moves with increasing vehicle speed said fulcrum is progressively positioned with respect to said lever and as said cross-head moves with diminishing vehicle speed said fulcrum is not positioned until after a delayed interval corresponding to a predetermined decrease in vehicle speed.

24. In a vehicle brake system, in combination, valve means for controlling a communication through which fluid under pressure is supplied to effect an application of the brakes and from which fluid under pressure is released to effect a release of the brakes, a lever for operating said valve means, a positionable fulcrum movable along said lever to govern the degree of application of the brakes, speed responsive means operative to shift said fulcrum with respect to said lever as the vehicle speed diminishes, and means operative to delay the shifting of said fulcrum over a chosen decreasing speed range of the vehicle.

25. In a vehicle brake system, in combination, a first pipe to which fluid under pressure is supplied to initiate an application of the brakes, a second pipe in which fluid pressures are established to a degree proportional to the pressures established in said first pipe, a mechanism including a movable fulcrum for governing the relation between the pressures in said two pipes, and means operated according to the speed of the vehicle for progressively positioning said fulcrum as the speed of the vehicle progressively increases, and for positioning said fulcrum with a delayed action as said speed progressively decreases.

26. In a vehicle brake system, in combination, a brake cylinder, pressure responsive means including a rockable element and a shiftable fulcrum for said element for controlling the degree of fluid under pressure supplied to said brake cylinder according to the position of said movable fulcrum with respect to said rockable element, and means operated according to the speed of the vehicle for progressively shifting said fulcrum in one direction as the speed of the vehicle progressively increases, and for shifting said fulcrum in the opposite direction with a delayed action as the speed of the vehicle progressively decreases.

27. In a vehicle brake system, in combination, a rockable element, a shiftable fulcrum for said element, means operated according to the speed of the vehicle for progressively shifting said fulcrum in one direction as the speed of the vehicle progressively increases and for shifting said fulcrum in the opposite direction with a delayed action as the speed of the vehicle progressively decreases, and means controlled by said rockable element for controlling the degree of application of the brakes.

CLYDE C. FARMER.